(12) United States Patent
Lipponen et al.

(10) Patent No.: US 12,478,255 B2
(45) Date of Patent: Nov. 25, 2025

(54) OPHTHALMIC APPARATUS AND ALIGNMENT METHOD

(71) Applicant: Optomed Plc, Oulu (FI)

(72) Inventors: Juha Lipponen, Oulu (FI); Ilkka Alasaarela, Oulu (FI); Matti Pohjoisaho, Oulu (FI); Seppo Rönkkö, Oulu (FI)

(73) Assignee: OPTOMED PLC, Oulu (FI)

( * ) Notice: Subject to any disclaimer, the term of this patent is extended or adjusted under 35 U.S.C. 154(b) by 442 days.

(21) Appl. No.: 18/106,852

(22) Filed: Feb. 7, 2023

(65) Prior Publication Data
US 2023/0248238 A1    Aug. 10, 2023

(30) Foreign Application Priority Data
Feb. 10, 2022   (FI) ...................................... 20225113

(51) Int. Cl.
*A61B 3/15* (2006.01)
(52) U.S. Cl.
CPC .................... *A61B 3/152* (2013.01)
(58) Field of Classification Search
CPC .............. A61B 3/152; A61B 3/14; A61B 3/12
USPC ........................................................ 351/208
See application file for complete search history.

(56) References Cited

U.S. PATENT DOCUMENTS

| 7,303,279 B2 | 12/2007 | Koennecke |
| 9,526,417 B1 | 12/2016 | Massetti et al. |
| 2003/0156741 A1 | 8/2003 | Lee et al. |
| 2009/0051873 A1* | 2/2009 | Lai .......................... A61B 3/14 351/221 |
| 2010/0033676 A1* | 2/2010 | De Vries ............ G01B 9/02091 351/206 |

(Continued)

FOREIGN PATENT DOCUMENTS

| AU | 2015203775 | 9/2015 |
| EP | 1803390 | 7/2007 |

(Continued)

OTHER PUBLICATIONS

Finnish Search Report for FI20225113, dated Sep. 2, 2022, 2 pages.

(Continued)

*Primary Examiner* — Mohammed A Hasan
(74) *Attorney, Agent, or Firm* — Nixon & Vanderhye PC (57) ABSTRACT

An ophthalmic apparatus includes an optical radiation source, which direct rays of optical radiation in a converging manner toward a reference plane, and causes the projections of the rays of optical radiation on a plane parallel to the normal of the reference plane to cross at a plane parallel to the reference plane and located deterministically relative to the reference plane, the crossing forming an alignment pattern of optical radiation on the reference plane. The ophthalmic apparatus, when directed toward the eye, captures images in a direction toward the reference plane including an area, where rays of optical radiation cross, and presents information on a pattern formed by the rays on a surface of a person or mammal whose eye the ophthalmic apparatus is directed toward. The alignment pattern when projected on an iris of the eye indicates that the iris of the eye is at the reference plane.

20 Claims, 10 Drawing Sheets

(56) References Cited

U.S. PATENT DOCUMENTS

| | | | |
|---|---|---|---|
| 2014/0240674 A1 | 8/2014 | Wei et al. | |
| 2014/0313485 A1 | 10/2014 | Umekawa | |
| 2017/0065170 A1* | 3/2017 | Yamashita | A61B 3/102 |
| 2019/0254514 A1* | 8/2019 | Westphal | A61B 3/102 |
| 2020/0015676 A1 | 1/2020 | Glik et al. | |
| 2021/0052158 A1 | 2/2021 | Tumlinson et al. | |
| 2021/0158525 A1* | 5/2021 | Iwase | A61B 3/0025 |
| 2022/0117486 A1* | 4/2022 | Yoshida | A61B 3/152 |

FOREIGN PATENT DOCUMENTS

| | | | |
|---|---|---|---|
| EP | 1803390 A2 * | 7/2007 | A61B 3/152 |
| EP | 2 000 079 | 12/2008 | |
| EP | 2000079 A1 * | 12/2008 | A61B 3/0075 |
| EP | 2 138 093 | 12/2009 | |
| EP | 2 243 421 | 10/2010 | |
| EP | 2243421 A1 * | 10/2010 | A61B 3/152 |
| WO | 2020/205860 | 10/2020 | |
| WO | 2022/136729 | 6/2022 | |
| WO | 2022/136730 | 6/2022 | |

OTHER PUBLICATIONS

Aug. 3, 2023 Search Report issued in GB Application No. GB2301768.4, pp. 1-2.

* cited by examiner

OPHTHALMIC APPARATUS AND ALIGNMENT METHOD

This application claims priority to FI 20225113 filed Feb. 10, 2022, the entire contents of which are hereby incorporated by reference.

FIELD

The invention relates to an ophthalmic apparatus and an alignment method.

BACKGROUND

A typical problem with an ophthalmic instrument is how to have alignment between the ophthalmic instrument and an eye that is observed with the ophthalmic instrument. A proper alignment requires that a distance between the ophthalmic instrument and the eye results in a reflection free and/or focused image of a desired portion of the eye. For reflection free and/or the focused image, the ophthalmic instrument should also be positioned properly in two lateral directions, which can be determined horizontal and vertical directions when the person whose eye(s) are under observation is standing or sitting. The alignment is challenging for all ophthalmic examination instruments which are used to examine optically any portion of the eye such as the cornea, the iris, the crystalline lens, the vitreous humor, the retina, the retinal nerve fiber layer and/or the fundus. A wrong alignment between the eye and the ophthalmic instrument leads to undesirable results such as dim or vignetted view and/or images with more or less spurious reflections or images which are out-of-focus. There are numerous proposals how to achieve the alignment, but they are not satisfying.

BRIEF DESCRIPTION

The present invention seeks to provide an improvement in the alignment.

The invention is defined by the independent claims. Embodiments are defined in the dependent claims.

If one or more of the embodiments is considered not to fall under the scope of the independent claims, such an embodiment is or such embodiments are still useful for understanding features of the invention.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment.

The articles "a" and "an" give a general sense of entities, structures, components, compositions, operations, functions, connections or the like in this document. Note also that singular terms may include pluralities.

Single features of different embodiments may also be combined to provide other embodiments. Furthermore, words "comprising" and "including" should be understood as not limiting the described embodiments to consist of only those features that have been mentioned and such embodiments may also contain features/structures that have not been specifically mentioned. All combinations of the embodiments may be considered possible if their combination does not lead to structural or logical contradiction.

The term "about" means that quantities or any numeric values are not exact and typically need not be exact. The reason may be tolerance, resolution, measurement error, rounding off or the like, or a fact that the feature of the solution in this document only requires that the quantity or numeric value is approximately that large. A certain tolerance is always included in real life quantities and numeric values.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for alignment, examination and/or controlling are irrelevant to the actual invention. Therefore, they need not be discussed in more detail here.

Figure 1:
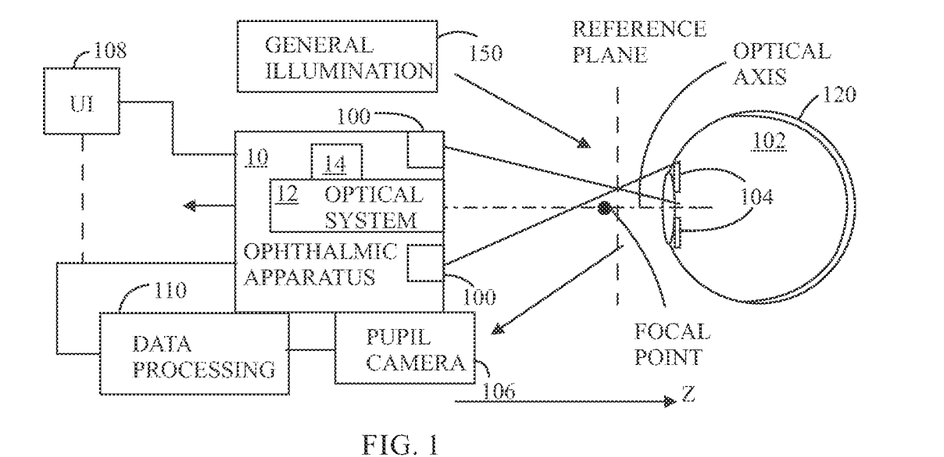
FIGS. 1 to 3 illustrate examples of an ophthalmic apparatus.
Figure 2:
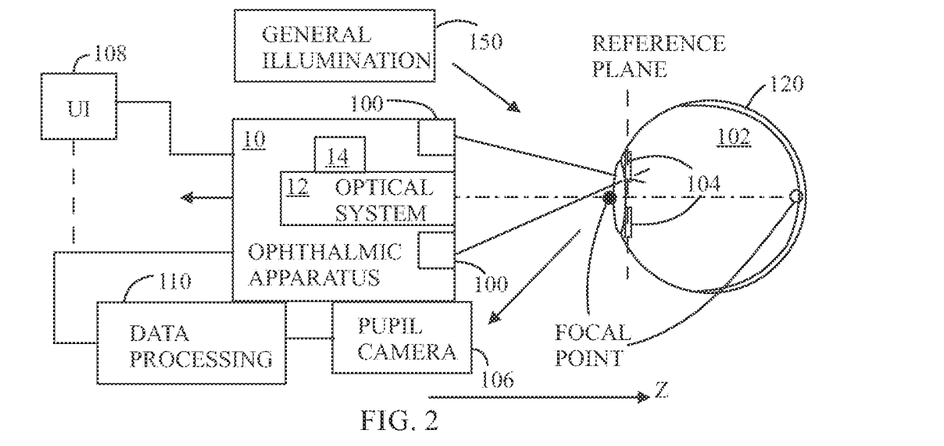
Figure 3:
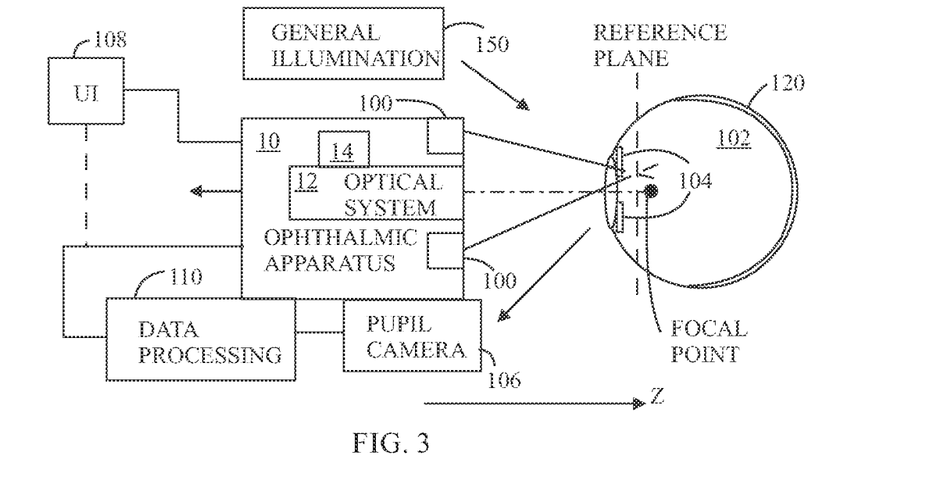

FIGS. 1, 2 and 3 illustrate examples of an ophthalmic apparatus 10 that comprises an optical radiation source 100. In an embodiment, the optical radiation source 100 may emit only infrared light. Alternatively, the optical radiation source 100 may emit only visible light. In an embodiment, the optical radiation source 100 may emit both infrared light and visible light, but percentage or weight of their portion of the whole output intensity may be different in different applications or embodiments and may be chosen to be suitable for observation of an eye 102.

The optical radiation source 100 directs rays of optical radiation in a converging manner toward a reference plane. The reference plane is a feature of an optical system 12 of the ophthalmic apparatus 10. The reference plane is similar to an image plane, and the reference plane may straight or curved. Because of the optical properties of the ophthalmic apparatus 10, the reference plane is located deterministically with respect to the ophthalmic apparatus 10. The reference plane is also deterministically located with respect to the focal point of the ophthalmic apparatus 10. In an embodiment, the focal point of the ophthalmic apparatus 10 is at the reference plane. In an embodiment, there is a distance between the focal point of the ophthalmic apparatus 10 and the reference plane. In an embodiment, the distance between the focal point of the ophthalmic apparatus 10 and the reference plane is adjustable. In an embodiment, the focal point is at infinity with respect to the reference plane.

Figure 12A:
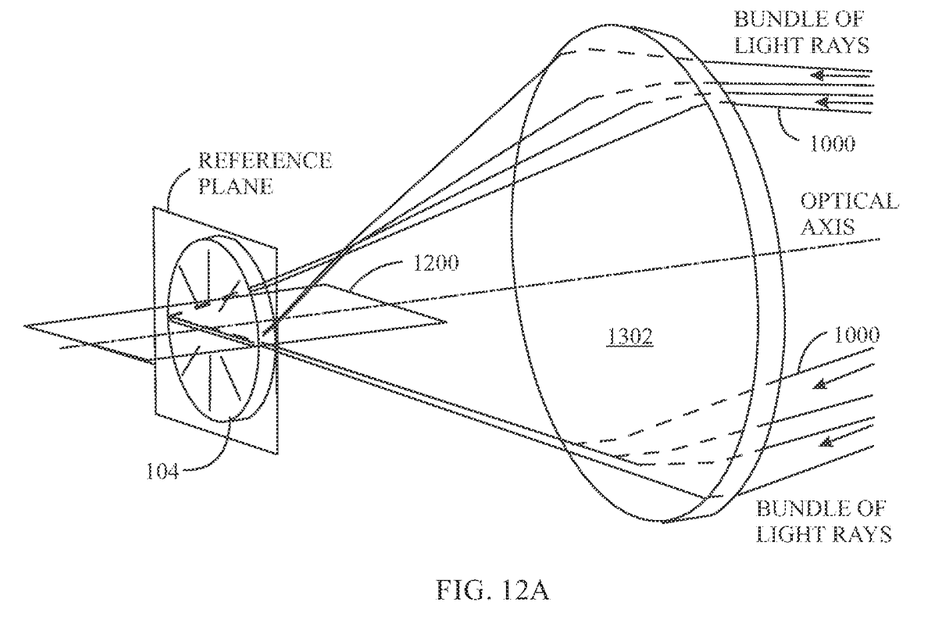
FIG. 12A illustrates an example of at least one bundle of rays of light coming from an objective of the ophthalmic apparatus and meeting at the reference plane.

The ophthalmic apparatus 10 causes the projections of the rays of optical radiation on a plane 1200 parallel to a normal of the reference plane to cross each other at a plane parallel to the reference plane and located deterministically with respect to the reference plane. The rays of the optical radiation may cross each other at the reference plane (see FIG. 12A). The crossing of the rays of the optical radiation forms a predefined guidance pattern 400 (see FIG. 4) in a range within which is the reference plane, and an alignment pattern 300, which is a pattern among the guidance patterns 400, on said reference plane.

In an embodiment, the rays of the optical radiation of the alignment pattern 300 from different directions may be closest to each other at the reference plane. When the rays of the optical radiation cross each other at the reference plane, a part or all of the rays of the optical radiation may touch or pass through each other. However, a part or all of the rays of the optical radiation may also have a non-zero distance therebetween and the rays of the optical radiation do not then touch or pass through each other.

In an embodiment, the beam formed by the rays, has waist at the reference plane. In that case, the beam may be said to have a focus at the reference plane.

FIG. 1 illustrates an example where the ophthalmic apparatus 10 is too far from the eye 102. In such a case, the eye 102 or actually an iris 104 of the eye 102 is not at the reference plane and the eye 102 may also be far from the focal point or from the image of the focal point through eye optics. The guidance pattern 400 cannot be seen, it is seen poorly or an instruction of the guidance pattern 400 to shorten a distance between the ophthalmic apparatus 10 and the eye 102 may be seen. A user may see the guidance pattern 400 in a user interface 108 which may be beside the ophthalmic apparatus 10 or may be seen through the optical system of the ophthalmic apparatus 10. If the user interface 108 is beside the ophthalmic apparatus 10, the user interface 108 may be attached to the ophthalmic apparatus or it may be physically separate device such as a monitor. The user may see the actual guidance pattern or the user may not see the actual guidance pattern. However, in the case the user does not see the actual guidance pattern, the user sees an indication by the user interface, the indication being based on the guidance pattern. The indication may be an image of the guidance pattern or a deterministically in a desired manner manipulated piece of information on the guidance pattern, for example.

FIG. 2 illustrates an example where a distance between the ophthalmic apparatus 10 and the eye 102 is such that the rays of the optical radiation cross each other at the iris 104 and the alignment pattern 300 is formed on the iris 104. This is the desired situation and the alignment is either correct for observing the eye 102 with the ophthalmic apparatus 10 or the observation of the eye 102 can be further improved.

In that position, the beams which are used to illuminate and examine (such as image) the eye, may be desirably positioned in respect to the eye in order to enable desirable performance. For example, in fundus cameras, this position may indicate the eye position, where illumination and imaging beams fulfill the Gullstrand's principle in respect to the eye under examination, and so reflection free images of the fundus can be captured.

The optical system 12 of the ophthalmic apparatus 10 may form an image of a certain portion of the eye 102 when an alignment pattern 300 is presented in the user interface 108 (see FIGS. 4 and 5), the portion being typically a surface of the eye 102, and the optical system 12 can form a focused image of the portion of the eye 102 when the focal point or its image is at said surface. The image of the eye may be seen a purely optical image through the ophthalmic apparatus 10 or it may be seen as an electrical representation on a screen (see FIG. 8). The distance between the eye 102 and the ophthalmic apparatus 10 is such that the focal point of the ophthalmic apparatus 10 is on the cornea which is desired to be observed in the example of FIG. 2. In some other case, the focal point of the ophthalmic apparatus 10 may be on some other surface of the eye 102 such as a surface of the crystalline lens or the retina, or any plane inside the crystalline lens or vitreous humor, for example.

A predetermined focal point of the ophthalmic apparatus 10 may be preset based on a typical eye. The typical eye may, in turn, be based on an Emsley model, Emsley-Gullstrand model, or Liou and Brennan schematic eye model, for example. The eye model may be similar to an anatomical and optical eye. It may have a power of about 60.4 D and an axial length of about 24 mm for example. The eye model may estimate aberrations in a visible range of light. The eye model may have variation depending on a size of a person 160 that is examined, sex and age especially when it is a question of a child, for example. That is, a model may be selected based on anatomical and/or optical information on the person 160 to be examined.

FIG. 2 also illustrates another example where the optical system 12 of the ophthalmic apparatus 10 is preset in a such fashion that the focal point of the ophthalmic apparatus 10 is at least approximately at the fundus of the eye 102 when the alignment pattern 300 is properly formed on the iris 104 (see the white dot at the fundus in FIG. 2). The optical system of the ophthalmic apparatus 10 may be adjustable and the focal point may be adjusted at any portion of the eye 102 irrespective of its presetting. The adjustment of the focus of the ophthalmic apparatus 10 may be performed manually or automatically.

The ophthalmic apparatus 10, when directed toward the eye 102, captures images in a direction toward the reference plane including an area, where rays of optical radiation are configured to cross, and present information on illumination and its possible pattern formed by the rays of optical radiation on a surface of a person or more generally a mammal whose eye 102 the ophthalmic apparatus 10 is directed toward. The ophthalmic apparatus 10 may comprise or be connected with a pupil camera 106 which may capture the images in a direction toward the reference plane including the area, where rays of optical radiation are configured to cross. The ophthalmic apparatus 10 also comprises or is connected with a user interface 108, which may comprise a screen, a keyboard, a mouse and/or a touchscreen or any other type of indicators including audio for inputting and outputting data. User interface can also include one or more separate keys and buttons to launch actions such as still image capture or focusing. The screen and/or the touchscreen may belong to the monitor, for example. The screen or the touchscreen of the user interface 10 shows the guidance pattern 400 and the surface on the face of the person whose eye is observed. Instead of the guidance pattern 400 and the surface of the face, the screen or the touchscreen may show indicators based on the guidance pattern 400.

The rays of the optical radiation may fall on the skin of the face and by moving the ophthalmic apparatus 10 the rays of the optical radiation may fall on an orbital region of the person. The orbital region of the face refers to an area at and adjacent to the bony cavity in the skull where the eye 102 resides. Finally, the rays of the optical radiation may be directed to the eye 102 and the iris 104. When the guidance pattern 400 is on the iris 104 and its image is thus properly formed and seen, the user of the ophthalmic apparatus 10 may receive information how to continue or to start observations or any other actions relating to the eye 102.

The predefined guidance pattern 400 of optical radiation, when projected on the iris 104 of the eye 102, indicates a relation of a location of the eye 102 with respect to the reference plane, and it also indicates that the eye 102 is located deterministically with respect to the ophthalmic apparatus 10.

When the alignment pattern 300 of the guidance pattern 400 is presented properly, the ophthalmic apparatus 10 is well aligned with the eye 102 with respective to the distance between the eye 102 and the ophthalmic apparatus 10. The situation, where the alignment pattern 300 is properly presented means, is explained in association with FIGS. 5, 10 and 11.

The alignment pattern 300 of the predefined guidance pattern 400 of optical radiation, when projected on the iris 104 of the eye 102, indicates that iris 104 of the eye 102 is at the reference plane, and it also indicates that the illumination and/or imaging beams of the optical system 112 of the ophthalmic apparatus 10 are positioned desired way in respect to the eye 102. For example, in the case of fundus cameras it may indicate that the eye 102 is positioned in respect to the illumination and imaging beams such that Gullstrand's principle is fulfilled, i.e. the illumination and imaging beams are separated from each other all the way from the cornea to the crystalline lens posterior surface. The fulfillment of the Gullstrand's principle may be based on the standard eye.

In an embodiment, the alignment pattern 300 of the predefined guidance pattern 400 of optical radiation, when projected on the iris 104 of the eye 102, indicates that iris 104 of the eye 102 is at the reference plane, and it also indicates that some surface of the eye 102 may be at the focal distance from the ophthalmic apparatus 10. The focal distance may refer a focal length such that when the optical system 12 of the ophthalmic apparatus 10 and the eye 102 have that the focal length therebetween an image of that surface of the eye 102 is focused. The focal distance may be based on the standard eye.

FIG. 3 illustrates an example where the distance between the eye 102 and the ophthalmic apparatus 10 is shorter than the distance between the reference plane and the ophthalmic apparatus 10. In this example the rays of the optical radiation cross each other within the eye 102 at the reference plane. In this example, also the focal point is within the eye 102. The guidance pattern 400 cannot be seen at all, poorly or some warning sign of the guidance pattern 400 can be seen (see FIGS. 4 and 5).

Figure 4:
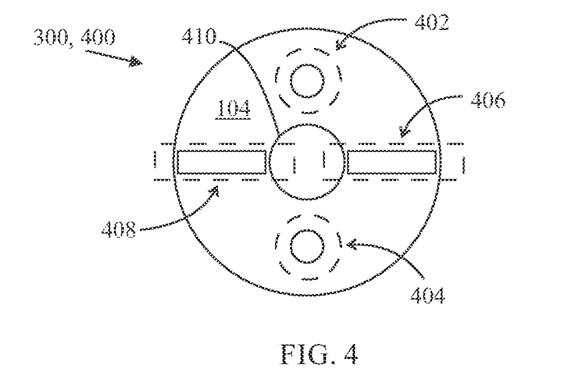
FIG. 4 illustrates an example of alignment patterns.

FIG. 4 illustrates an example of the alignment pattern 300 of the guidance pattern 400 optical radiation that comprises sub-patterns 402, 404, 406, 408 radially distributed round an optical axis of the ophthalmic apparatus 10. The distribution of the sub-patterns 402, 404, 406, 408 may be circular and/or symmetrical. The distribution of the sub-patterns 402, 404, 406, 408 may alternatively be non-symmetrical with respect to the optical axis of the ophthalmic apparatus 10. The distribution causes the sub-patterns 402, 404, 406, 408 to be directed only on an area of the iris 104 when the ophthalmic apparatus 10 is aligned with the eye 102. In this manner, a pupil 410 of the eye 102 may be kept free from the rays of the optical radiation of the guidance pattern 400 while performing observations and/or actions related to the eye 102. However, it is not necessary to keep the pupil of the eye free from rays particularly when rays have most of the power in near-infrared wavelengths.

FIG. 4 illustrates also an example of a situation where the iris 104 is not at the reference plane. In such a situation, which may be similar to that of FIG. 1 or FIG. 3, the alignment pattern 300 may be blurred on the iris 104 and that is illustrated with dashed line. In that kind of situation, the sub-patterns 402, 404, 406, 408 may be larger and have lower irradiance than in the situation where the iris 104 is at the reference plane and focused, which is illustrated with the continuous line of the sub-patterns 402, 404, 406, 408. The difference in size of the sub-patterns 402, 404, 406, 408 in a situation where the iris 104 is at the reference plane and in a situation where the iris 104 is not at the reference plane is caused by the rays of the optical radiation, which converge between the ophthalmic apparatus 10 and the reference plane and diverge thereafter. In FIG. 4 the sub-patterns 402, 404, 406, 408 refer to an area within which the rays of optical illumination of each sub-patterns reside. The sub-patterns 402, 404, 406, 408 may thus be fully illuminated or only partially or discretely illuminated.

Figure 5:
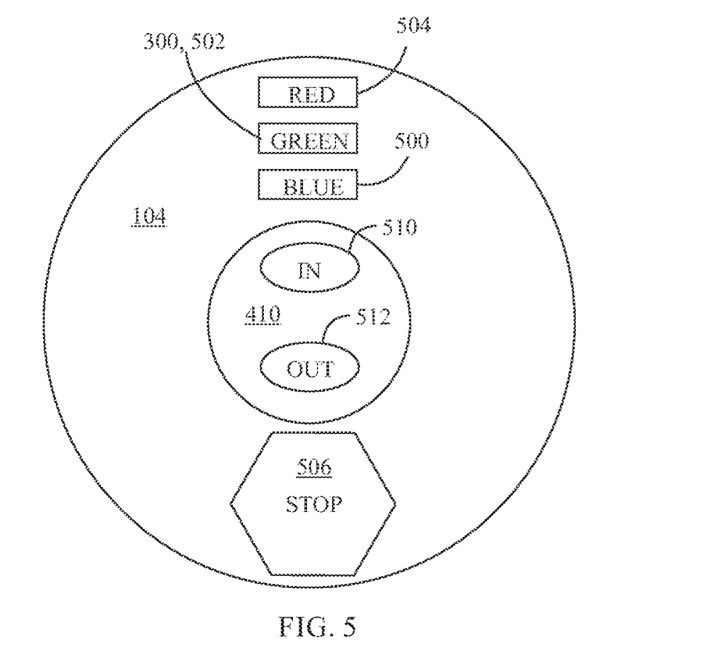
FIG. 5 illustrates an example of guidance patterns.

FIG. 5 illustrates an example of an embodiment, where red, green and blue colors or texts appear on the iris 104 depending on the distance between the ophthalmic apparatus 10 and the eye 102. A first sub-pattern 500 of the predefined guidance pattern 400 or it can also be called a predefined guidance pattern 500, which may be or refer to blue, for example, may be seen on the iris 104 when the ophthalmic apparatus 10 is approaching the eye 102 but is still too far for the observation. In this manner, the user sees that he/she is in on the correct path of finding a proper location for observing the eye 102. When the ophthalmic apparatus 10 is brought closer to the eye 102, the first sub-pattern 500 may start fading and a sub-pattern 502 that is also the alignment pattern 300, which may be green, for example, may appear and it may be presented properly. This signals the user that a correct distance between the eye 102 and the ophthalmic apparatus 10 has been reached from the alignment point of view and observation of the eye 102 can be started although the observation may require focusing. If the ophthalmic apparatus 10 is brought too close to the eye 102, a third sub-pattern 504 of the guidance pattern 400 may appear and that tells the user that he/she should increase the distance between the eye 102 and the ophthalmic apparatus 10. If the ophthalmic apparatus 10 is further pushed closer to the eye 102, a fourth sub-pattern 506 of the guidance pattern 400 may appear and it commands the user to stop approaching the eye 102 because the ophthalmic apparatus 10 may soon have a physical contact with the eye 102. Note that all these signs may be seen on any surface, not only on the iris 10, when the ophthalmic apparatus 10 is directed to them.

In an embodiment, a data processing unit 110 may compute an amount of z-offset and/or its direction. This enables indication of an amount of movement in the z-dimension and/or direction to the user.

In order to realize this kind of operation the rays of the optical radiation of the first sub-pattern 500 may be least converging and the fourth sub-pattern 506 may be the most converging. The convergences of other sub-patterns 502, 504 are therebetween in an order explained above.

Figure 6:
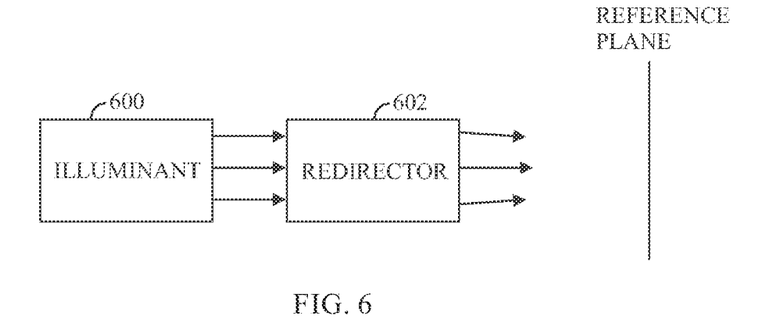
FIGS. 6 and 7 illustrate examples of optical radiation sources.

In an embodiment an example of which is illustrated in FIG. 6, the optical radiation source 100 comprises an optical illuminant 600 and a redirecting arrangement 602, which may direct the rays of optical radiation output by the optical illuminant 600 in a converging manner toward the reference plane.

In an embodiment, the optical illuminant 600 may output one or more individual optical beams, which may be collimated, converging or diverging, and the redirecting arrangement 602 comprises a spatial light modulator arrangement, which may rearrange the one or more optical rays of optical radiation into at least two optical rays that converges while propagating toward the reference plane. The rearranging of the at least one optical beam may include splitting of one or more of the optical beams into two or more rays and/or redirecting the propagation of light of the at least one beam. Splitting of a beam of light may be performed by a beamsplitter, for example. The spatial or angular light modulator arrangement, which may include one or more beamsplitters, may redirect the light of the one or more beams and it may be electrically controlled, static, mechanical, or acousto-optic, for example. Controllable spatial light modulator arrangement may adjust or variate the guidance pattern 400 as function of time. A static spatial light modulator arrangement may form a temporally constant guidance pattern 400.

In an embodiment, the optical illuminant 600 may output a single optical ray, and the redirecting arrangement 602 may scan the single optical ray in a converging manner toward a reference plane. The redirecting arrangement 602 may scan the predefined guidance pattern several times to thousands times a second, for example. The spatial light modulator may also in this case be electrically controlled, mechanical, or acousto-optic, for example.

In an embodiment, the illuminant 600 may output a plurality of optical rays, and the redirecting arrangement 602 may direct the plurality of the optical rays in a converging manner toward a reference plane.

In an embodiment, the illuminant 600 may comprise at least one optical semiconductor device. The optical illuminant 600 may be laser a light emitting diode, or a superluminescent diode for example.

Figure 7:
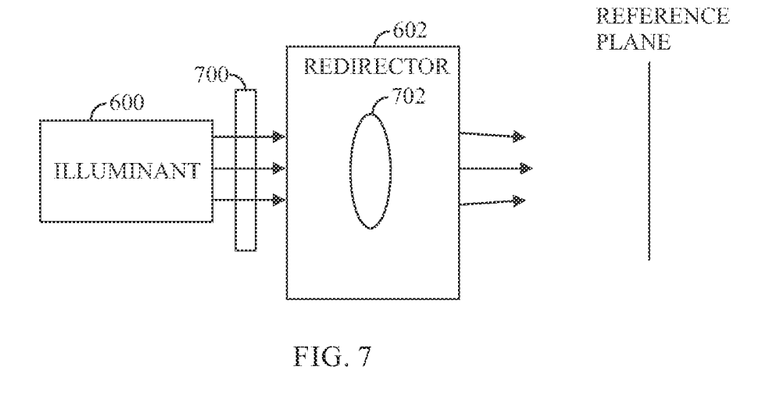

In an embodiment an example of which is illustrated in FIG. 7, the optical illuminant 600 may comprise an image structure 700 of the guidance pattern 400.

The image structure 700 may be or may be formed by one or more apertures, transparencies, or masks.

The image structure 700 may be or may be formed by a picture generator such as an LCD (liquid crystal display), an OLED (organic-light-emitting diode display), an LCOS (liquid-crystal on silicon), a DMD (digital micro-mirror device) micro-display or by any spatial or angular modulator configured to form structured light. Instead of directly forming the image of the guidance pattern 400 and particularly the alignment pattern 300, the image of the guidance pattern 400 or the alignment pattern 300 may be projected on a surface, which may then further be projected using an image forming optical system toward the reference plane. The image of the guidance pattern 400 and/or the alignment pattern 300 may be a still image or a video.

The redirecting arrangement 602 may then comprise an imaging optical component 702 which may comprise one or more lenses that form a real image. Instead of the one or more lenses curved mirror may be used or any combination of lenses and mirrors. The optical illuminant 600 may direct light to the image structure 700 of the guidance pattern 400, which may include the alignment pattern 300 only, and the imaging component 702 may then direct the rays of optical radiation, which have interacted with the image structure 700 of the guidance pattern 400 or the alignment pattern 300 only, in a converging manner toward a reference plane.

In an embodiment an example of which is illustrated in FIGS. 6 and 7, the optical illuminant 600 may output infrared light with limited or no visible light output.

Figure 9:
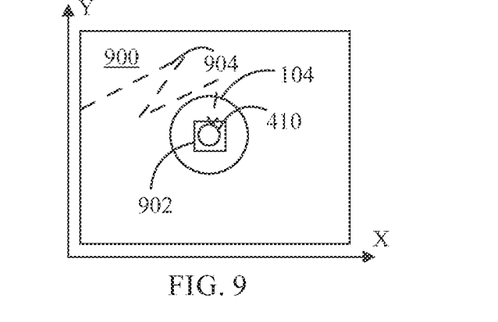
FIG. 9 illustrates an example of image of an iris and a pupil on a surface of a detector.

The ophthalmic apparatus 10, when directed toward the eye 102, may capture images, using the pupil camera 106, in a direction of the reference plane including the area, where rays of optical radiation are configured to cross. As an example of FIG. 9 shows, the ophthalmic apparatus 10 may then present the user information on a location of an image of a pupil 410 of the eye 102 of the person whose eye 102 the ophthalmic apparatus 10 is directed toward on the detector surface 900 of the pupil camera 106 of the ophthalmic apparatus 10. The square illustrates an example of a suitable, desirable and/or predetermined location 902 of the pupil 410 the eye 102 on the detector surface 900, and FIG. 9 illustrates an example that the pupil 410 is indeed located there. A line 904 illustrates an example of a route of the pupil 410 on the detector surface 900. In this manner, the eye 102 may be aligned with the ophthalmic apparatus 10 also in two other dimensions in addition to the dimension related to the distance between the eye 102 and the ophthalmic apparatus 10. When the distance between the eye 102 and the ophthalmic apparatus 10 is determined in a Z-axis, the two other lateral dimensions are determined in an X-axis and a Y-axis (see also FIGS. 1, 2 and 3).

In an embodiment, the ophthalmic apparatus 10, when directed towards the eye 102, may capture an image of or through the pupil 410 of the eye 102 in response to the image of the pupil 410 being located at a predetermined location 904 on the detector surface 900. The presented information enables the user to perform an action related to the eye 102 while having the image of the pupil 410 of the eye 102 at the predetermined location 902 on the detector surface 900.

The pupil camera 106 may comprise a CMOS (complementary metal oxide semiconductor), CCD (charged coupled device) sensor array, or a scanned line array. The pupil camera 106 may include one or more lenses for image formation. The pupil camera 106 may focus to the iris 104 of the eye 102 when the eye is not in its desired position. In an embodiment, the pupil camera 106 may have autofocus, for example. In an embodiment, the pupil camera 106 may be focused at a fixed distance, for example. The pupil camera 106 may be optically conjugated with the optical radiation source 100.

In an embodiment, the convergence of light in the optical system of the pupil camera 106 may be conjugated or matched with the reference plane and/or the convergence of light of the optical radiation source. In an embodiment, the numerical apertures of the pupil camera 106 and the optical radiation source 100 are conjugated or made to match each other. In an embodiment, the pupil camera 106 may capture at least one image of the iris 104.

In an embodiment, the pupil camera 106 is at least approximately telecentric, which means that magnification of the iris 104 does not change or changes only a little when a distance between the eye 102 and the ophthalmic apparatus 10 changes.

Figure 10:
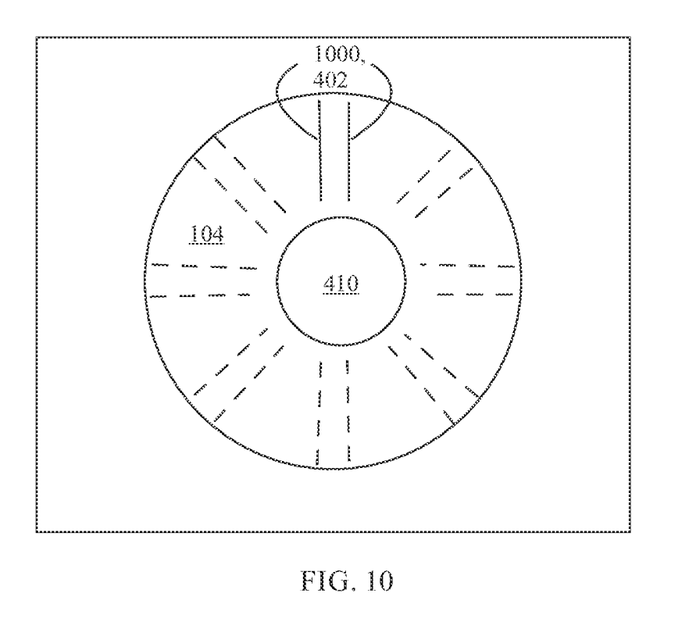
FIGS. 10 and 11 illustrates examples of the alignment pattern(s) on the iris.

FIG. 10 illustrates an example where the alignment pattern 300 is not properly formed on the iris 104 of the eye

Figure 11:
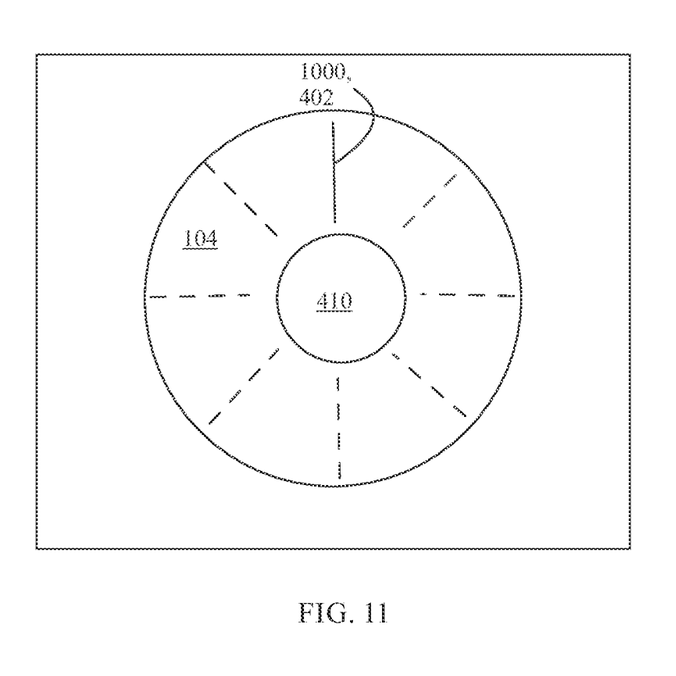

102. FIG. 11 illustrates an example where the alignment pattern 300 is properly formed on the iris 104 of the eye 102. In FIG. 10, the iris 104 is not at the reference plane. Because of the convergence of the rays of light, which cross each other at the reference plane, band-like rays i.e. a bundle of light rays 1000 of this example (bundle of light rays, see FIG. 12A) do not meet at the iris 104 but the rays of the at least one bundle 1000 are spaced from each other in FIG. 10 making the sub-pattern 402 to split. In this example, the sub-pattern 402 split into two. In FIG. 11, the bundle 1000 of light rays of light meet each other at the iris 104 because the iris 104 is at the reference plane. Only one sub-pattern 402 of the at least one bundle 1000 of light rays have been marked in FIG. 10 but it is possible that there are a plurality of them as the dashed lines show. In FIG. 11 the at least one bundle 1000 of light rays are overlapping.

FIG. 10 illustrates a situation where the eye 102 is at a desired location with respect to the ophthalmic apparatus 10 when the rays of the at least one bundle 1000 are at a predetermined distance from each other. The predetermined distance may be zero distance, such that the rays of light of the at least one bundle 1000 overlap or touch each other. Alternatively, the distance between the rays of the at least one bundle 1000 may be a predetermined non-zero distance from each other. In an embodiment, the non-zero distance may be less than a millimeter, for example. In an embodiment, the non-zero distance may be less than two millimeters, for example. In an embodiment, the non-zero distance may be less than two millimeters, for example. In an embodiment, the non-zero distance may be less than three millimeters, for example. In an embodiment, the non-zero distance may be less than four millimeters, for example. In an embodiment, the non-zero distance may be less than five millimeters, for example.

Figure 12B:
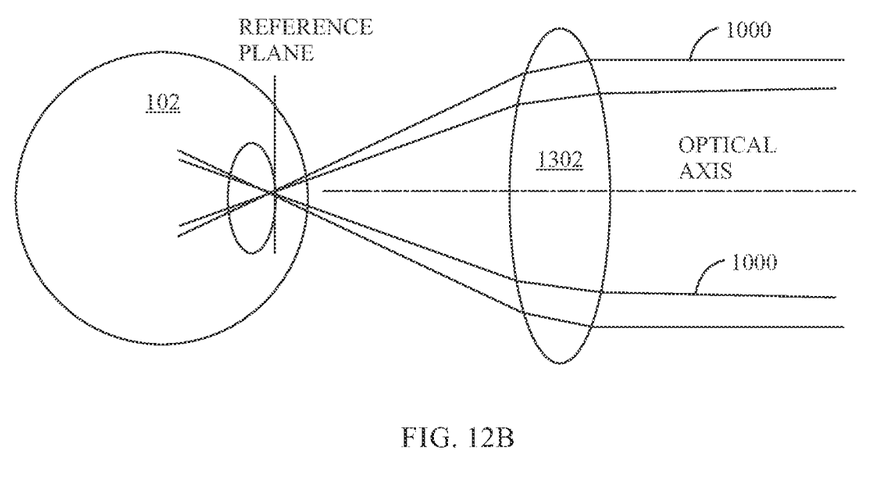
FIG. 12B illustrates an example where the eye seen from side receives two bundles of light or rays of at least one bundle of rays of light that meet at the reference plane.
Figure 12C:
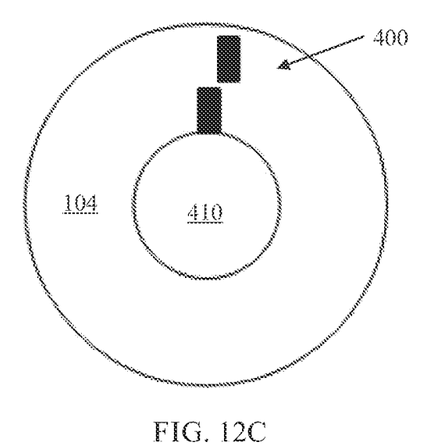
FIGS. 12C to 12K illustrate examples of shapes of spots on the iris, the spots being caused by illumination of the guidance patterns.

FIGS. 12B to 12E illustrate an embodiment, where each of two bundles 1000 of light rays or the rays of the at least one bundle 1000, the rays being non-parallel form a line-shaped predefined guidance pattern 400 on the iris 104. When the eye 102 is at a desired location with respect to the ophthalmic apparatus 10, the lines of the predefined guidance pattern 400 may be aligned with each other as depicted in FIG. 12C.

Figure 12D:
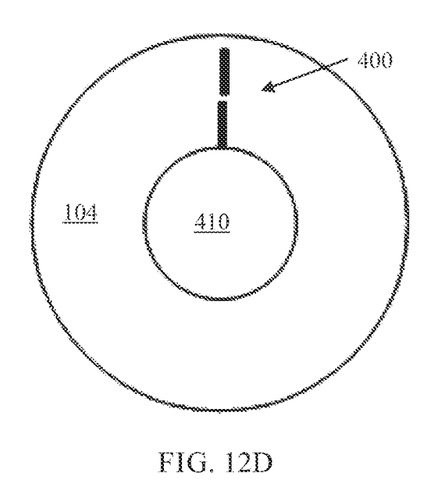
Figure 12E:
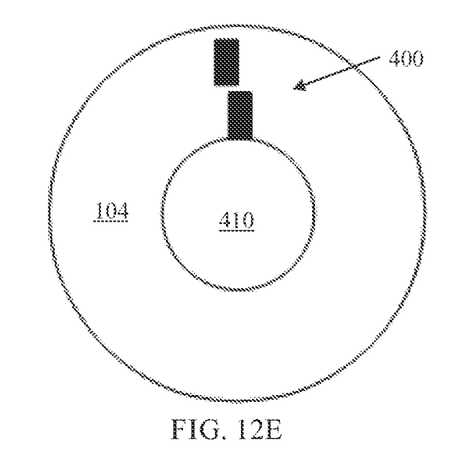

FIGS. 12D and 12E illustrate the situation when the eye 102 is too far from or too close to the ophthalmic apparatus 10. An axial misalignment of the eye 102 in the direction of the optical axis may be determined from the positions of the lines of the predefined guidance pattern 400 with respect to each other. That is, the upper line of the predefined guidance pattern 400 may be to the right from the lower line of the predefined guidance pattern 400 (the eye 102 is too far in this example) or the upper line of the predefined guidance pattern 400 may be to the left from the lower line of the predefined guidance pattern 400 (the eye 102 is too close in this example). When the upper and lower lines of the predefined guidance pattern 400 are in line with each other, the distance of the eye 102 from the apparatus 10 is correct in this example. As shown in FIG. 12B, that can be achieved by arranging the two bundles 1000 or rays of at least one bundle 1000, the rays being non-parallel, to illuminate the iris 104 from opposite sides of the optical axis.

Figure 12F:
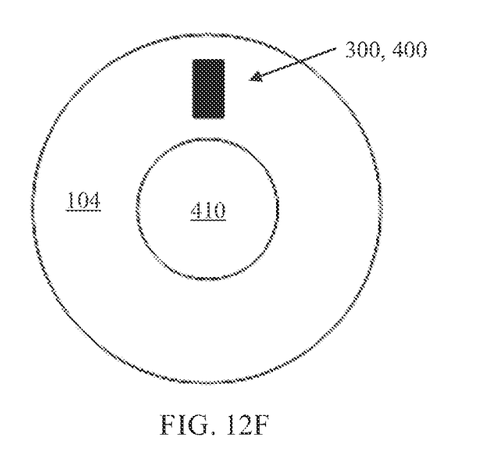
Figure 12G:
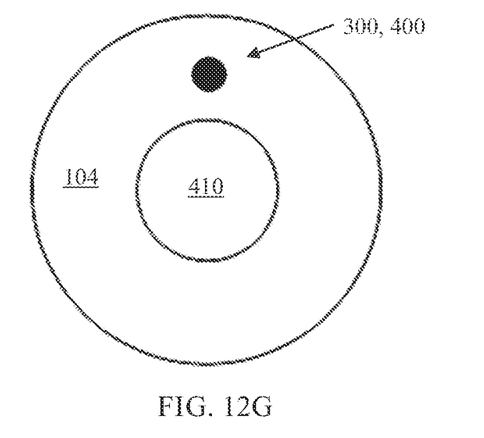
Figure 12H:
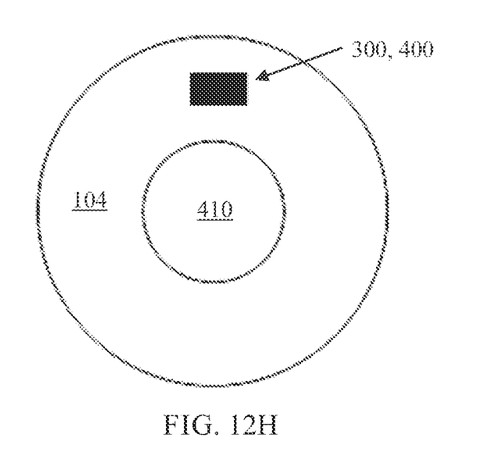

FIG. 12G illustrates another embodiment where a spot of the predefined guidance pattern 400 is projected on the surface of the iris 104 when the eye 102 is in the desired position in respect to the ophthalmic apparatus 10. The illumination beam may be purposefully introduced astigmatism, which spreads the spot of the predefined guidance pattern 400 more to one direction when the eye 102 is too far and more to another direction when the eye 12 is too close the ophthalmic apparatus 10, as depicted in FIGS. 12F and 12H.

Figure 12I:
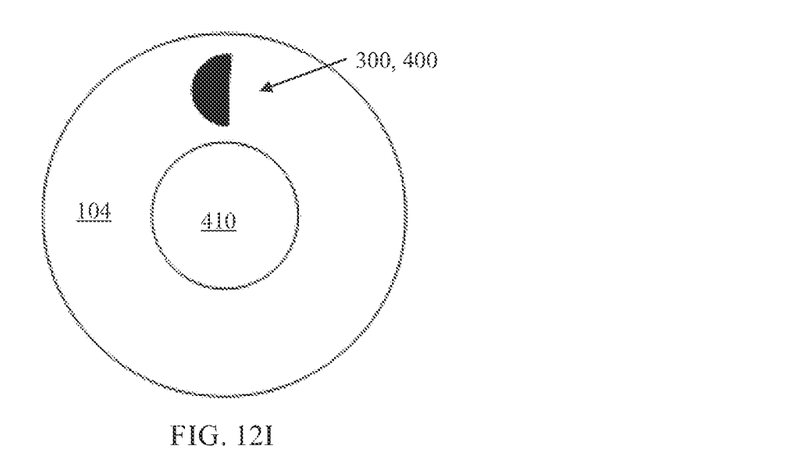
Figure 12J:
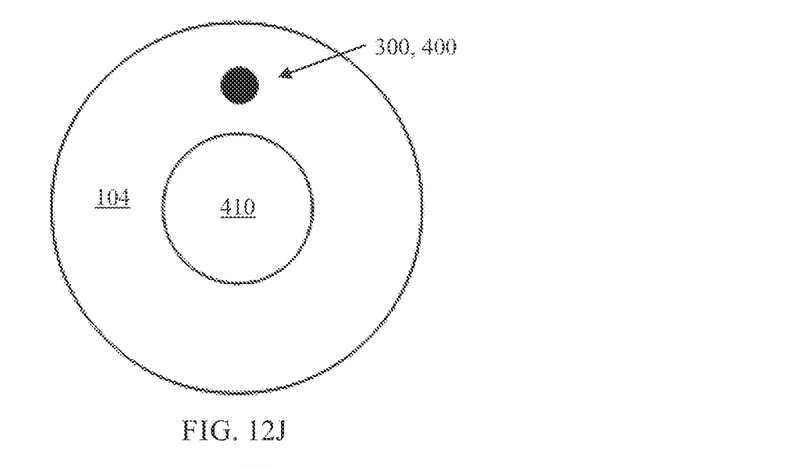
Figure 12K:
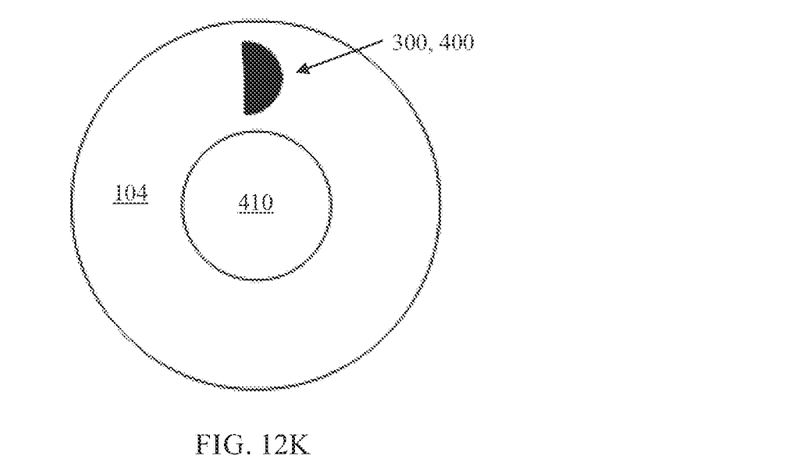

FIGS. 12I, 12J and 12K show still another embodiment, where a spot of the predefined guidance pattern 400 is projected on the surface of the iris 104 when the eye 102 is in the desired position in respect to the ophthalmic apparatus 10. When viewed from the projected spot of the predefined guidance pattern 400, the illuminating beam has asymmetric angular distribution. In this example the asymmetry is shown in a shape of a half-disc. The asymmetry indicates the direction toward which the ophthalmic instrument 10 needs to be moved in respect to the eye 102 in order to get the eye 102 located in a desired position.

Instead of astigmatism, spherical aberration, longitudinal chromatic aberration, or any asymmetry in illumining beam axial direction, or in the angular distribution, for example, may be used to introduce pattern structure which varies in a known manner as a function of z-position. The variation may provide directional information, or numerical value of a z-position of the eye 102 in respect to the ophthalmic instrument 10.

In general in this embodiment, the optical radiation source 100 may direct at least one bundle 1000 of rays of light of the optical radiation in an asymmetric manner toward the plane 1200, the plane 1200 being parallel to the normal of the reference plane. Here the bundle of rays of light should be understood as a bundle of rays of light that are not parallel to each other. Then the asymmetry causes a predetermined variation of a shape of the alignment pattern 300 on the surface of the person or mammal whose eye 102 the ophthalmic apparatus 10 is directed toward as a function distance between said surface and the ophthalmic apparatus 10. In this example the surface may be the iris 102 as presented in FIGS. 12C to 12K.

In an embodiment, the numerical aperture of the pupil camera 106 is equal to or less than about 0.2. In an embodiment, the numerical aperture of the pupil camera 106 is equal to or less than about 0.1. These numerical apertures allow a long depth-of-field.

Figure 8:
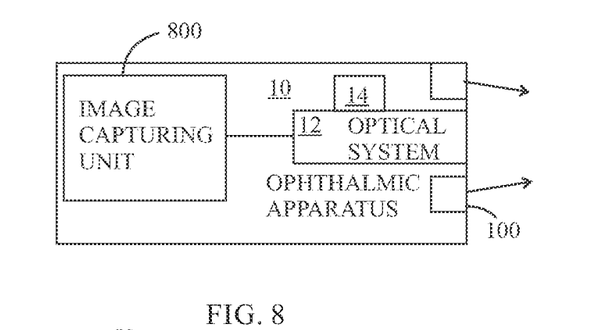
FIG. 8 illustrate an example of the ophthalmic apparatus with an image capture unit.
Figure 13:
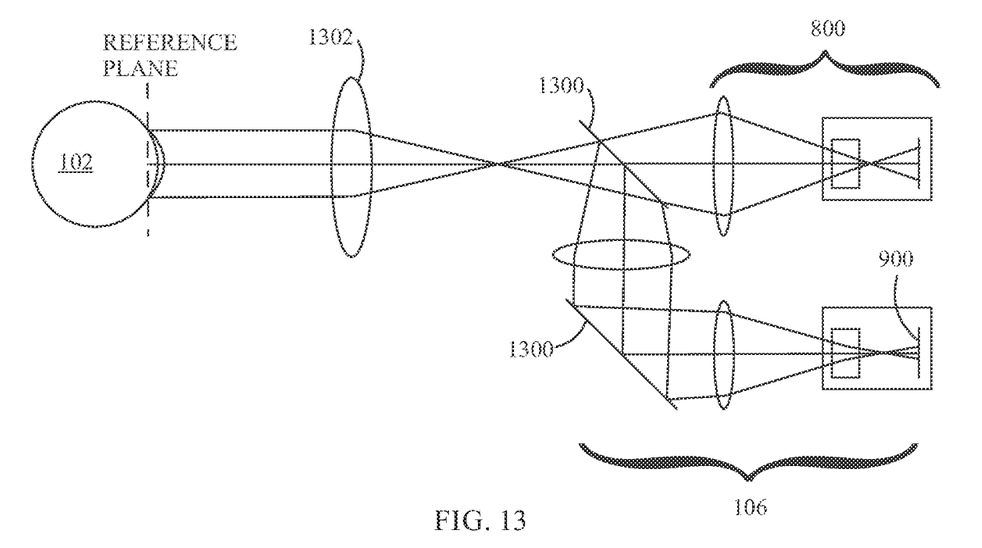
FIG. 13 illustrates an example of the ophthalmic apparatus with the pupil camera and an image capture unit.

In an embodiment examples of which are illustrated in FIGS. 8 and 13, the ophthalmic apparatus 10 comprises an image capture unit 800, a field-of-view of which is directed toward the reference plane including the area, where the rays of optical radiation are configured to cross. The image capture unit 800 captures focused images of any object that is at the focal point of the optical system 12 of the ophthalmic apparatus 10. Because the focal point is one point in the focal plane of the optical system 12 of the ophthalmic apparatus 10, the image capture unit 800 captures focused images of objects that are on the image plane of the optical system 12 and within the field of view of the optical system 12.

The image capture unit 800 may be separated from the pupil camera 106 using at least one beamsplitter 1300, which may be non-polarizing, polarizing, dichroic, or non-dichroic, for example.

An objective lens 1302, which may be common to the pupil camera 106 and the image capture unit 800 may form an image of the iris 104 of the eye 102 on the detector surface 900 of the pupil camera 106.

The image capture unit 800 may capture images of the fundus 120 (see FIG. 1), for example. In order to examine the fundus 120, the fundus 120 is illuminated with light that has passed through the pupil 410, reflected from the fundus 120, passed again through the pupil 120, and received by the ophthalmic apparatus 10. FIG. 5 illustrates a beam 510 that enters the eye 102 and illuminates the fundus 120 and a beam 512 that has reflected from the fundus 120 and propagating toward the ophthalmic apparatus 10. Here the fundus 120 that is examined may refer to the retina, for example. The retina may be examined in the manner illustrated in FIG. 13, for example.

In an embodiment an example of which is illustrated in FIGS. 1, 2 and 3, the ophthalmic apparatus 10 may comprise a general illuminant 150, which is configured to illuminate, with a constant distribution without a pattern, a field-of-illumination including the area, where the rays of optical radiation are configured to cross at the reference plan.

In an embodiment, the general illuminant 150 is configured to output infrared light with limited or no visible light output.

Figure 14:
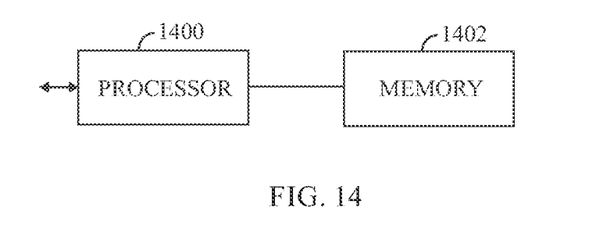
FIG. 14 illustrates an example of the data processing unit.

In an embodiment an example of which is illustrated in FIG. 14, the data processing unit 110 comprises one or more processors 1400 and one or more memories 1402 including computer program code.

The one or more memories 1402 and the computer program code configured to, with the one or more processors 1400, cause the ophthalmic apparatus at least to: capture the images in the direction of the reference plane including the area, where the rays of optical radiation are configured to cross, and present the information on the pattern formed by the rays of optical radiation on a surface of a person whose eye 102 the ophthalmic apparatus 10 is directed toward.

In an embodiment, the one or more memories 1402 and the computer program code are configured to, with the one or more processors 1400, cause the ophthalmic apparatus at least to: present information on the location of the image of the pupil 410 of the eye 102 of the person whose eye 104 the ophthalmic apparatus 10 is directed toward on the detector surface 900 of the ophthalmic apparatus 10.

In an embodiment, the pupil 410 may be recognized automatically. Additionally, the size of the pupil 410 may be automatically computed and presented to the user in the user interface 108.

In this manner, the ophthalmic apparatus 10 may perform an automatic recognition of pupil position and position comparison to a targeted position. This allows indication if the pupil 410 is decentered or in a desired position. The indication also allows a presentation of a direction to which the ophthalmic apparatus 10 or the eye 102 should be moved in the lateral xy-dimension. Additionally, also the amount of the lateral movement may be presented to the user.

The ophthalmic apparatus 10 may be or comprise a phoropter, keratometer, autorefractor, slit lamp, tonometer, retinoscope, retinal camera, fundus camera, optical coherence tomography system (OCT), scanning laser ophthalmoscope (SLO), anterior segment analyzer, corneal topographer, pupilometer, ophthalmoscope, fundus perimetry, any combination these or the like. Also apparatus may include alignment and/or image capturing mechanism with motor which may work without an operator of the apparatus. This may mean that alignment and/or image capturing mechanism is automatic.

Figure 15:
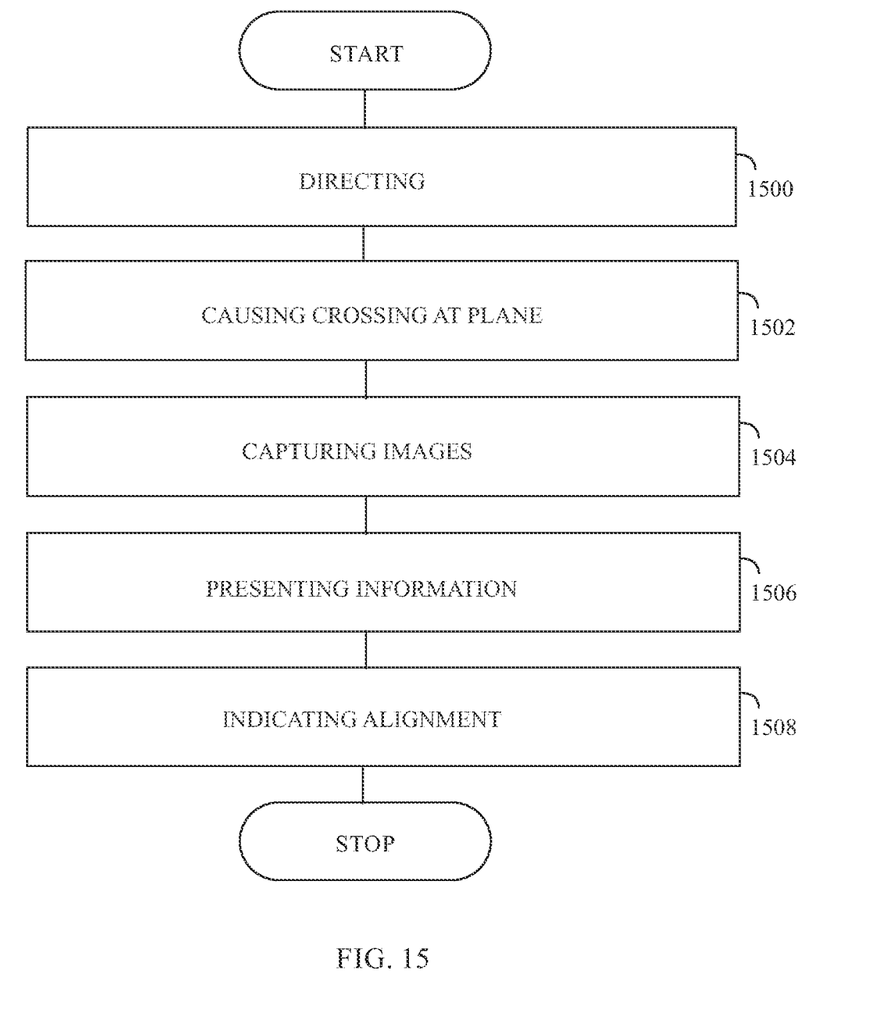
FIG. 15 illustrates of an example of a flow chart of an alignment method.

An alignment method of an ophthalmic apparatus 10 is illustrated in FIG. 15. The ophthalmic apparatus 10 comprises an optical radiation source 100. In step 1500, rays of optical radiation are directed in a converging manner toward a reference plane.

In step 1502, the projections of the rays of optical radiation on a plane 1200 parallel to the normal of the reference plane are caused to cross each other at a plane parallel to the reference plane and located deterministically with respect to the reference plane, the crossing forming an alignment pattern 300 of optical radiation on said reference plane.

In step 1504, images are captured, by the ophthalmic apparatus 10 when directed toward the eye 102, in a direction toward the reference plane including an area, where rays of optical radiation are configured to cross.

In step 1506, information is presented on a pattern formed by the rays of optical radiation on a surface of a person whose eye 102 the ophthalmic apparatus 10 is directed toward.

In step 1508, the alignment pattern 300 of optical radiation when projected on an iris 104 of the eye 102, indicates that the iris 104 of the eye 102 is located at the reference plane.

The method shown in FIG. 15 may be implemented as a logic circuit solution or computer program. The computer program may be placed on a computer program distribution means for the distribution thereof. The computer program distribution means is readable by a data processing device, and it encodes the computer program commands, carries out the alignment and optionally controls the processes on the basis of the alignment.

The computer program may be distributed using a distribution medium which may be any medium readable by the controller. The medium may be a program storage medium, a memory, a software distribution package, or a compressed software package. In some cases, the distribution may be performed using at least one of the following: a near field communication signal, a short distance signal, and a telecommunications signal.

It will be obvious to a person skilled in the art that, as technology advances, the inventive concept can be implemented in various ways. The invention and its embodiments are not limited to the example embodiments described above but may vary within the scope of the claims.

The invention claimed is:

1. An ophthalmic apparatus, comprising:
an optical radiation source, wherein the optical radiation source comprises an optical illuminant and a redirecting arrangement, which is configured to direct rays of optical radiation output by the optical illuminant in a converging manner toward a reference plane, such that the optical radiation source is configured to:
direct the rays of optical radiation in a converging manner toward the reference plane, and
cause the projections of the rays of optical radiation on a plane parallel to the normal of the reference plane to cross each other at a plane parallel to the reference plane and located deterministically with respect to the reference plane, the crossing forming an alignment pattern of optical radiation on said reference plane;
wherein the optical radiation source is configured to direct rays of light of at least one bundle of light of the optical radiation in an asymmetric manner toward the plane parallel to the normal of the reference plane, the asymmetry causing a predetermined variation of a shape of the alignment pattern on the surface of the person or mammal whose eye the ophthalmic apparatus is directed toward as a function of a distance between said surface and the ophthalmic apparatus;
wherein the ophthalmic apparatus, when directed toward the eye, is configured to capture images in a direction toward the reference plane including an area, where rays of optical radiation are configured to cross, and present information on a pattern formed by the rays of optical radiation on a surface of a person or mammal whose eye the ophthalmic apparatus is directed toward; and wherein the alignment pattern of optical radiation when projected on an iris of the eye is configured to indicate that the iris of the eye is at the reference plane.

2. The apparatus of claim 1, wherein the alignment pattern of optical radiation comprises sub-patterns radially distributed round around an optical axis of the ophthalmic apparatus to facilitate the sub-patterns being directed on an area of the iris.

3. The apparatus of claim 1, wherein the optical illuminant is configured to output one or more individual optical rays, and the redirecting arrangement comprises a light modulator arrangement, which is configured to direct the one or more optical rays of optical radiation in a converging manner toward the reference plane.

4. The apparatus of claim 3, wherein the optical illuminant is configured to output a plurality of optical rays, and the redirecting arrangement is configured to direct the plurality of the optical rays in a converging manner toward the reference plane.

5. The apparatus of claim 1, wherein the optical illuminant is configured to output infrared light with limited or no visible light output.

6. The apparatus of claim 1, wherein the ophthalmic apparatus comprises an image capture unit, a field-of-view of which is directed toward the reference plane including the area, where the rays of optical radiation are configured to cross;

the ophthalmic apparatus, when directed toward the eye, is configured to capture images in a direction of the reference plane including the area, where rays of optical radiation are configured to cross, and present information on a location of an image of a pupil of the eye of the person whose eye the ophthalmic apparatus is directed toward on a detector surface of the ophthalmic apparatus; and the ophthalmic apparatus, when directed towards the eye, is configured to capture an image of a portion of the eye and/or through the pupil of the eye in response to the image of the pupil being located at a predetermined location on the detector surface, the presented information enabling a user to perform an action related to the eye while having the image of the pupil of the eye at the predetermined location on the detector surface.

7. The apparatus of claim 6, wherein the ophthalmic apparatus comprises a general light source, which is configured to illuminate a field-of-illumination including the area.

8. The apparatus of claim 6, wherein the general light source is configured to output infrared light with limited or no visible light output.

9. The apparatus of claim 1, wherein a pupil camera of the ophthalmic apparatus is telecentric, the image capturing unit being configured to capture an image of or through the pupil and the pupil camera being configured to capture an image of the iris.

10. The ophthalmic apparatus of claim 1, wherein the ophthalmic apparatus comprises:
one or more processors; and
one or more memories including computer program code; the one or more memories and the computer program code configured to, with the one or more processors, cause the ophthalmic apparatus at least to:
capture the images in the direction of the reference plane including the area, where the rays of optical radiation are configured to cross, and present the information on the pattern formed by the rays of optical radiation on the surface of the person whose eye the ophthalmic apparatus is directed toward.

11. The apparatus of claim 10, wherein the one or more memories and the computer program code are configured to, with the one or more processors, cause the ophthalmic apparatus at least to:
present information on the location of the image of the pupil of the eye of the person whose eye the ophthalmic apparatus is directed toward on a detector surface of the ophthalmic apparatus.

12. An ophthalmic apparatus, comprising:
an optical radiation source, wherein the optical radiation source comprises an optical illuminant and a redirecting arrangement, which is configured to direct rays of optical radiation output by the optical illuminant in a converging manner toward a reference plane, such that the optical radiation source is configured to:
direct the rays of optical radiation in a converging manner toward the reference plane, and
cause the projections of the rays of optical radiation on a plane parallel to the normal of the reference plane to cross each other at a plane parallel to the reference plane and located deterministically with respect to the reference plane, the crossing forming an alignment pattern of optical radiation on said reference plane;
wherein the optical illuminant comprises an image structure of the alignment pattern and an imaging optical component as the redirecting arrangement;
wherein the optical illuminant is configured to direct light to the image structure of the alignment pattern and the imaging component is configured to direct the rays of optical radiation, which have interacted with the image structure of the alignment pattern, in a converging manner toward the reference plane;
wherein the ophthalmic apparatus, when directed toward the eye, is configured to capture images in a direction toward the reference plane including an area, where rays of optical radiation are configured to cross, and present information on a pattern formed by the rays of optical radiation on a surface of a person or mammal whose eye the ophthalmic apparatus is directed toward; and
wherein the alignment pattern of optical radiation when projected on an iris of the eye is configured to indicate that the iris of the eye is at the reference plane.

13. The apparatus of claim 12, wherein the ophthalmic apparatus comprises an image capture unit, a field-of-view of which is directed toward the reference plane including the area, where the rays of optical radiation are configured to cross;

the ophthalmic apparatus, when directed toward the eye, is configured to capture images in a direction of the reference plane including the area, where rays of optical radiation are configured to cross, and present information on a location of an image of a pupil of the eye of the person whose eye the ophthalmic apparatus is directed toward on a detector surface of the ophthalmic apparatus; and the ophthalmic apparatus, when directed towards the eye, is configured to capture an image of a portion of the eye and/or through the pupil of the eye in response to the image of the pupil being located at a predetermined location on the detector surface, the presented information enabling a user to perform an action related to the eye while having the image of the pupil of the eye at the predetermined location on the detector surface.

14. The apparatus of claim 13, wherein the ophthalmic apparatus comprises a general light source, which is configured to illuminate a field-of-illumination including the area.

15. The apparatus of claim 13, wherein the general light source is configured to output infrared light with limited or no visible light output.

16. The ophthalmic apparatus of claim 12, wherein the ophthalmic apparatus comprises:
one or more processors; and
one or more memories including computer program code;
the one or more memories and the computer program code configured to, with the one or more processors, cause the ophthalmic apparatus at least to:
capture the images in the direction of the reference plane including the area, where the rays of optical radiation are configured to cross, and present the information on the pattern formed by the rays of optical radiation on the surface of the person whose eye the ophthalmic apparatus is directed toward.

17. The apparatus of claim 16, wherein the one or more memories and the computer program code are configured to, with the one or more processors, cause the ophthalmic apparatus at least to:
present information on the location of the image of the pupil of the eye of the person whose eye the ophthalmic apparatus is directed toward on a detector surface of the ophthalmic apparatus.

18. An alignment method of an ophthalmic apparatus, the ophthalmic apparatus comprising an optical radiation source, the optical radiation source comprising an optical illuminant and a redirecting arrangement, which is configured to direct rays of optical radiation output by the optical illuminant in a converging manner toward a reference plane, the method comprising:
directing the rays of optical radiation in a converging manner toward reference plane via the optical radiation source; and
causing the projections of the rays of optical radiation on a plane parallel to the normal of the reference plane to cross each other at a plane parallel to the reference plane and located deterministically with respect to the reference plane, the crossing forming an alignment pattern of optical radiation on said reference plane;
wherein the optical illuminant comprises an image structure of the alignment pattern and an imaging optical component as the redirecting arrangement;
wherein the optical illuminant is configured to direct light to the image structure of the alignment pattern and the imaging component is configured to direct the rays of optical radiation, which have interacted with the image structure of the alignment pattern, in a converging manner toward the reference plane, the method further comprising:
capturing, by the ophthalmic apparatus when directed toward the eye, images in a direction toward the reference plane including an area, where rays of optical radiation are configured to cross;
presenting information on a pattern formed by the rays of optical radiation on a surface of a person whose eye the ophthalmic apparatus is directed toward; and
indicating, by the alignment pattern of optical radiation when projected on an iris of the eye, that the iris of the eye is located at the reference plane.

19. The method of claim 18, further comprising capturing the images in the direction of the reference plane including the area, where the rays of optical radiation are configured to cross, and presenting the information on the pattern formed by the rays of optical radiation on the surface of the person whose eye the ophthalmic apparatus is directed toward.

20. The method of claim 19, further comprising presenting information on the location of the image of the pupil of the eye of the person whose eye the ophthalmic apparatus is directed toward on the detector surface of the ophthalmic apparatus.

* * * * *